United States Patent [19]

Eisenkopf

[11] 3,916,528

[45] Nov. 4, 1975

[54] APPARATUS FOR COMPENSATION OF DIMENSIONAL POSITION CHANGES

[75] Inventor: Hermann Eisenkopf, Naunheim, Germany

[73] Assignee: Ernst Leitz GmbH, Wetzler, Germany

[22] Filed: June 7, 1974

[21] Appl. No.: 477,211

[52] U.S. Cl. .......... 33/125 C; 33/174 TA; 318/634; 408/13
[51] Int. Cl.² ........................................ B23Q 17/18
[58] Field of Search .......... 33/125 R, 125 C, 125 A, 33/125 T, 174 TA, 1 M; 355/53, 54; 354/31; 250/231 SE, 237 G; 83/72, 74; 408/13; 318/632, 634, 603, 640

[56] References Cited
UNITED STATES PATENTS

| | | | |
|---|---|---|---|
| 2,730,807 | 1/1956 | Collins | 33/125 R |
| 2,916,826 | 12/1959 | Bower et al. | 33/125 C |
| 2,988,681 | 6/1961 | Bower | 318/632 |
| 3,449,588 | 6/1969 | Foskett | 250/231 SE |
| 3,744,902 | 7/1973 | Henker | 33/174 TA |
| 3,749,501 | 7/1973 | Wieg | 250/237 G |

FOREIGN PATENTS OR APPLICATIONS

| | | | |
|---|---|---|---|
| 448,526 | 5/1949 | Italy | 33/125 R |

*Primary Examiner*—Richard E. Aegerter
*Assistant Examiner*—John W. Shepperd
*Attorney, Agent, or Firm*—Erich M. H. Radde

[57] ABSTRACT

Apparatus for the compensation of different changes in shape of two instrument parts displaceable in relation to one another includes two separate position detecting assemblies associated at spaced positions with the parts and comprising appropriate scale or indicator assemblies for deriving electrical signals representative of positional changes at the locations of the positive detectors. These signals are averaged and subsequently either displayed or used for correcting the position of one of the parts relative the other, with the average signal representing the position at a point of interest intermediate the position detectors. In this manner, high accuracy is obtained without necessitating that measurements be taken exactly at the particular points of interest.

9 Claims, 1 Drawing Figure

U.S. Patent  Nov. 4, 1975  3,916,528
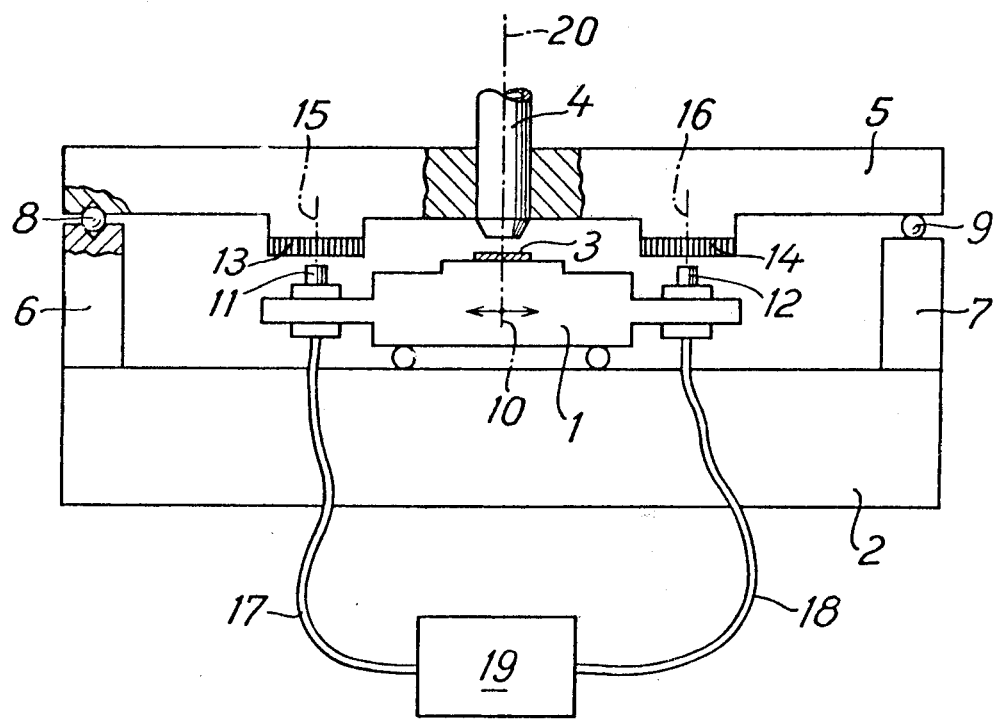

APPARATUS FOR COMPENSATION OF DIMENSIONAL POSITION CHANGES

BACKGROUND OF THE INVENTION

1. Field of the Invention

The present invention relates generally to systems for positional compensation, and more particularly, to apparatus for compensation of different dimensional variations between two instrument parts measurably displacable with respect to each other in at least one coordinate direction.

2. Description of the Prior Art

The prior art is cognizant of systems in which a scale on one of two instrument parts is used for the purpose of measuring the relative displacement of the two instrument parts, and in which the amounts of such displacement are picked-up by a suitable detector located on the other instrument part. Together, the scale and the detector may be referred to as a position meter. In precision instrumentation and optics, such position meters are formed by photo-electric scanning of grating rulings or modulation of the light diffracted from moving gratings, providing the basis of very useful and tested incremental transducers.

Since at least one of the relatively displaceable instrument parts frequently will hold an object to be measured, examined, processed, machined, etc., it is not feasible as a rule to measure the displacement directly at the location of the particular object. However, in order to observe Abbe's principle, the design will attempt to provide — to the extent possible — that the segment to be measured will be the rectilinear extension of the graduation being used as a scale. Under normal circumstances, this approximation is generally acceptable; however, expansion and contraction of the parts of the apparatus due to temperature changes introduce errors which often cannot be disregarded.

If, for instance, this principle of approximate measurement and compensation is used, and an object mounted on the movable instrument part is to be positioned with respect to a working tool or for instance an optical projection device located on the fixed part of the instrument, then one must pay attention to the possibility of differing changes in length being experienced by the position meter assembly and the actual location of the object because of temperature fluctuations. This means that the parts to be positioned with respect to each other may be located quite differently from the value indicated by the position meter. While such deviations in position may be kept very slight by suitable selection of material, they cannot, however, be neglected in such instances as mask or screen production in the preparation of semi-conductors. Even inhomogeneities in material structure or lattice in the same material may adversely affect the two instrument parts. Thus, while the problem of positioning an object with respect to an instrument part accurately and without taking a direct measurement at the location of the object has long been known, a fully satisfactory solution has heretofore been unavailable.

SUMMARY OF THE INVENTION

It is, therefore, an object of the present invention to precisely measure the position of one instrument part with respect to another with compensation for changes in position due to dimensional variations.

Another object of this invention is to couple two independent position meters with two relatively movable instrument parts and to electronically obtain the average of output signals from the position meters for compensation.

A further object of the present invention is to construct apparatus having two relatively movable parts, and to dispose a pair of independent position meters symmetrically to the center of one of the instrument parts.

This invention has another object in the derivation of a position compensation signal by obtaining the average of two independent position signals produced symmetrically about a location under observation.

A still further object of this invention is to provide automatic compensation for changes in position between two relatively movable parts in a mask or screen production assembly for semi-conductors wherein two position detector subassemblies are disposed symmetrically on either side of the photographic substrate being made and the output signals from both of these detectors are averaged and used as a feedback control signal for positioning apparatus.

In accomplishing the foregoing objects, there is provided in accordance with the invention an apparatus of the above described type wherein two independent position meters, i.e., each including a scale plus position detector, are coupled to the two instrument parts in the direction of measurement and are associated with a device for obtaining the average value of the two position readings. Two identical incremental transducers may be provided as the position meters. In a special embodiment of the invention, one of the two instrument parts may be a precision cross table support, and the position meters are arranged symmetrically with respect to the middle of the support.

The present invention may be summarized in that apparatus for the compensation of different changes in shape of two instrument parts displaceable in relation to one another by a measuring technique in at least one coordinate direction includes a first instrument part, a second instrument part movable with respect to said first instrument part, first and second position detecting means associated with said two instrument parts at locations spaced in a measurement direction to generate output signals representative of the relative position of said first and second parts at each of said spaced locations respectively, and circuit means coupled with said first and second position detecting means to provide an average signal from said output signals, said average signal being proportional to the relative position of said first and second parts at a defined measurement location.

The present invention exhibits numerous advantages over the prior art in that precise position signals may be derived without taking measurements directly at the point of an object under examination, that derived signals are precisely representative of position rather than being an approximation thereof, and that compensation for all dimensional variations caused by temperature changes is accomplished in a simple, economical and maintenance free manner.

Other objects and advantages of the present invention will become apparent from the following description of a preferred embodiment when taken in conjunction with the accompanying drawing.

BRIEF DESCRIPTION OF THE DRAWING

The FIGURE is a diagrammatic elevational view, with parts shown in section, of a preferred embodiment of apparatus for compensation of different changes in dimensional shape of two instrument parts according to the present invention.

DESCRIPTION OF THE PREFERRED EMBODIMENT

Referring to the FIGURE, an object to be processed, such as a photographic plate 3, rests on a carriage or table 1 which is movably supported on a base plate 2 and which may be moved in the direction of the arrow to various positions by means of suitable adjusting apparatus (not shown). A projection device 4 is located above the photographic plate, and is held by a support bridge 5. The latter rests on upright supports 6, 7 that are rigidly connected to the base plate 2. Bearings 8, 9 for bridge 5 are of such design that the bridge will rest on support 6 in a stationary manner while being freely movable on support 7 in the direction of the displacement of table 1, i.e., in the direction of the arrow. In this manner, changes in the length of the bridge which are caused by temperature fluctuations will not cause stresses in the assembly.

Two position detectors 11, 12 are mounted symmetrically to the center 10 of table 1 in a line parallel to the direction of motion or displacement of table 1. Scale embodiments 13, 14 preferably designed as gratings, are rigidly connected with bridge 5 such that they lie in the same plane in which is located the emulsion of photographic plate 3. The particular position or location values sensed by position detectors 11, 12 are denoted by the dashed lines 15, 16. They are fed in the form of electrical signals via lines 17, 18 to an averager 19. The electrical average formed may be displayed or be used as a control or adjusting input signal to a reference comparator (not shown) for controlling an adjusting assembly (not shown) which positions table 1.

The following considerations will explain the compensation provided by the present invention in order to correct for differing changes in length of table 1 and bridge 5 as might be caused by temperature variations.

With respect to the particular exemplary embodiment shown in the drawing, namely that of a projection device 4 and photographic plate 3, an original (not shown) is focused along the optical axis 20 of projection device 4 to provide an image on photographic plate 3. If, for instance, the position of table 1 is kept fixed in response to a position output signal derived solely from position detector 11, it can be readily appreciated that a differing change in length of bridge 5 and table 1 between lines 15 and 20 due to expansion and/or contraction will result in a new focusing of the original on photographic plate 3, which is shifted with respect to the former focusing. If, on the other hand, the average of the values indicated by the position detectors 11 and 12 is selected as the position value of table 1, then this average value will change if there are differing changes of length for bridge 5 and table 1 provided that the position value from detector 11 is arbitrarily considered to be a constant. Thus, one will obtain a precise indication for the change of length and by shifting the table to the initially measured average position value, one may obtain reproducible focusing on photographic plate 3.

In conclusion, it can be appreciated that the present invention provides for the accurate and reproducible positioning of one instrument part relative another where it is not possible to take measurements at the particular location of interest. As opposed to prior art techniques, the present apparatus does not rely on approximations and takes full consideration of the unequal dimensional variations caused by temperature changes which have heretofore resulted in inaccuracy of precision apparatus having plural, relatively movable parts.

It is apparent that various modifications, changes or other uses can be made in and of the disclosed invention without departing from the spirit and scope thereof. For example, as alternative position meters there may be employed correlation meters of the type disclosed in German Pat. No. 2,144,487, measuring microscopes or electrical-inductive measuring meters as discussed at pages 100 and 104, respectively, of Lueger, "Lexikon der Feinwerk technik," Vol. 2. In place of position detectors 11 and 12, $x$-$y$ meters of the type disclosed in German Offenlegungsschrift No. 2,127,483 may be used. Furthermore, the system of the invention can also be used in connection with comparative microscopes, measuring microscopes or other devices for accurately positioning workpieces in manufacturing processes. Therefore, the scope of the invention is to be determined only by the appended claims.

What we claim is:

1. Apparatus for the compensation of changes in position, due to dimensional variation, between two instrument parts, said parts being displaceable in relation to one another in at least one coordinate direction, comprising a first instrument part, a second instrument part movable with respect to said first instrument part along a coordinate and including means to support same adjacent said first instrument part, first and second means, associated with said two instrument parts at locations spaced substantially along said coordinate, for detecting the position of said instrument parts along said coordinate, said position detecting means generating output signals representative of the relative position of said first and second parts at each of said spaced locations respectively, and circuit means coupled with said first and second position detecting means to provide an average signal from said output signals, said average signal being proportional to the relative position of said first and second parts at a measurement location intermediate said detecting means.

2. Apparatus according to claim 1 wherein each of said position detecting means are mounted an equal distance from the center of said second instrument part.

3. Apparatus according to claim 2 wherein said position detecting means comprise first and second gratings on said first instrument part.

4. Apparatus according to claim 3 wherein said first and second cooperating detecting means comprise identical incremental transducers.

5. Apparatus according to claim 3 wherein said second instrument part comprises a support member for a photographically responsive substrate.

6. Apparatus according to claim 4 wherein said first instrument part comprises a photographic lens.

7. Apparatus according to claim 6 wherein said first and second gratings and said photographically responsive substrate are disposed in a common plane.

8. Apparatus according to claim 2 wherein said second instrument part comprises a precision cross table support.

9. The apparatus as defined by claim 1, wherein each of said position detecting means includes a scale associated with one of said instrument parts and a cooperating position detecting means associated with the other of said instrument parts.

* * * * *

PO-1050
(5/69)

UNITED STATES PATENT OFFICE
CERTIFICATE OF CORRECTION

Patent No. __3,916,528__  Dated __November 4, 1975__

Inventor(s) __HERMANN EISENKOPF__

It is certified that error appears in the above-identified patent and that said Letters Patent are hereby corrected as shown below:

On the preamble page after "[21] Appl. No.: 477,211" there should be inserted:

-- [30] Foreign Application Priority Data
June 12, 1973  Germany  P 2329712.3 --

Signed and Sealed this

*third* Day of *February 1976*

[SEAL]

Attest:

RUTH C. MASON
*Attesting Officer*

C. MARSHALL DANN
*Commissioner of Patents and Trademarks*